United States Patent Office 3,808,222
Patented Apr. 30, 1974

3,808,222
3H-1,2,3-BENZODITHIAZOLE-2-OXIDES
William Carter Doyle, Jr., Leawood, Kans., assignor to Gulf Research & Development Company, Pittsburgh, Pa.
No Drawing. Application Oct. 12, 1970, Ser. No. 80,204, which is a continuation of abandoned application Ser. No. 777,158, Nov. 19, 1968. Divided and this application May 18, 1972, Ser. No. 254,663
Int. Cl. C07d 91/70
U.S. Cl. 260—304       3 Claims

ABSTRACT OF THE DISCLOSURE

A group of 3H-1,2,3-benzodithiazole-2-oxides which may have various substituents in the 4-, 5-, 6- and 7-positions are prepared by hydrolysis of the corresponding 1,3,2-benzothiazathiolium chlorides. The compounds possess utility as post-emergent herbicides and dyestuff intermediates.

---

This is a division of U.S. patent application Ser. No. 80,204, filed Oct. 12, 1970, which is a continuation of U.S. Ser. No. 777,158, filed Nov. 19, 1968, now abandoned.

DESCRIPTION OF INVENTION

We have discovered a novel class of 3H-1,2,3-benzodithiazole-2-oxides which are effective as selective herbicides, particularly against some common broadleaf weeds in crops such as wheat, barley, oats and corn.

The novel compounds belong to a group represented by the structural formula:

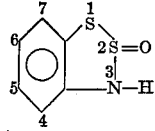

in which substituents at positions 4-, 5-, 6- and 7- are selected from the following groups:

at position 4-: H—, Cl—, CH$_3$—, CF$_3$—, F— and CH$_3$O—
at position 5-: H—, Cl—, CH$_3$— and CF$_3$—
at position 6-: H—, Cl—, CH$_3$O— and CH$_3$S—
at position 7-: H—, Cl— and CH$_3$ The compounds are prepared by hydrolysis of the corresponding 1,3,2-benzothiazathiolium chlorides, as discussed as follows.

PREPARATION OF 1,3,2-BENZOTHIAZATHIOLIUM CHLORIDES (I)

Three general methods may be used to prepare the intermediate benzothiazathiolium chlorides: Method A is the original procedure of Herz, as recently described in more detail by Huestis, Walsh and Hahn (2). One mole of the aniline in glacial acetic acid is treated with seven moles of sulfur monochloride. Method B is a modification of method A in that the aniline is first converted to the hydrochloride and the molar excess of sulfur monochloride is only 3.5 fold. Under these conditions, the elemental sulfur byproduct is no longer soluble in the reaction mixture, but can easily be removed following the hydrolysis step. Method C, the novel procedure of Huestis, Walsh and Hahn (2), uses the reaction of ortho-aminobenzenethiol hydrochlorides with thionyl chloride. Since the reaction of sulfur monochloride with anilines unsubstituted in the para position invariably results in chlorination at that position, method C is recommended for those 3H-1,2,3-benzodithiazole-2-oxides having hydrogen at the 6-position.

The choice between the use of an aniline or its hydrochloride is not entirely arbitrary. With 2,5-dimethylaniline and o-trifluoromethyl aniline, method A produces only tars and non-hydrolyzable solids, while method B gives the the desired products in good yields.

PREPARATION OF 3H-1,2,3-BENZODITHIAZOLE 2-OXIDES (II)

An aqueous slurry of the benzothiazathiolium chloride is stirred at room temperature for about one hour. The solid is collected, dissolved in methanol and treated with activated charcoal. Addition of water to the filtered solution gives the product as a colorless, or pale violet, crystalline solid. Further purification by recrystallization is impractical, as even brief heating in any of a variety of solvents causes extensive decomposition with evolution of sulfur dioxide.

REFERENCES TO SYNTHESIS PROCEDURES (1) Herz, R. (to Cassella & Co.), German Pat. 360,690 (Oct. 6, 1922).
(2) Huestis, L., Walsh, M., Hahn, N., J. Org. Chem., 30, 2763 (1965) and references therein.
(3) Warburton, W. K., Chem. Rev., 57, 1011 (1957).

SPECIFIC COMPOUNDS

Specific 3H-1,2,3-benzodithiazole 2-oxides which have been prepared and the methods of preparation, melting points and analytical data are shown in Table I.

TABLE I
3H-1,2,3-benzodithiazole 2-oxides

| Substituents | | | | | M.P. (° C.) | Carbon | | Hydrogen | | Nitrogen | |
| --- | --- | --- | --- | --- | --- | --- | --- | --- | --- | --- | --- |
| 4 | 5 | 6 | 7 | | | Calculated | Found | Calculated | Found | Calculated | Found |
| Cl | H | Cl[1] | Cl | A | 132-5 | 26.24 | 27.67 | 0.73 | 0.65 | 5.10 | 5.27 |
| H | Cl | Cl[1] | Cl | A | 131-3 | 26.24 | 26.82 | 0.73 | 0.88 | 5.10 | 5.45 |
| CH$_3$ | H | Cl[2] | H | A | 126-7 | 38.27 | 38.77 | 2.74 | 3.02 | 6.38 | 6.53 |
| CH$_3$ | CH$_3$ | Cl[1] | H | A | 139-40 | 41.11 | 41.70 | 3.45 | 3.59 | 5.99 | 5.76 |
| CH$_3$ | H | Cl[1] | CH$_3$ | B | 123-5 | 41.11 | 41.76 | 3.45 | 3.23 | 5.99 | 6.15 |
| CF$_3$ | H | Cl[1] | H | B | 133-4 | 30.72 | 30.12 | 1.11 | 1.50 | 5.12 | 5.28 |
| H | CF$_3$ | H | H | C | 124-7 | 35.14 | 36.11 | 1.69 | 2.03 | 5.86 | 6.21 |
| OCH$_3$ | H | OCH$_3$ | Cl | B | 140-3 | 36.16 | 35.61 | 3.03 | 3.04 | 5.27 | 5.48 |
| H | H | SCH$_3$ | H | B | 121 | 38.68 | 39.23 | 3.25 | 3.59 | 6.45 | 6.86 |
| F | H | Cl[1] | H | A | 107-8 | 32.22 | 31.82 | 1.35 | 1.74 | 6.26 | 6.81 |
| H | Cl | H | H | C | 129-31 | 35.03 | 38.40 | 1.96 | 2.28 | 6.81 | 7.53 |
| Cl | Cl | Cl | H | A | 119 | 26.24 | 23.47 | 0.73 | 1.54 | 5.10 | 4.83 |
| CH$_3$ | Cl | Cl | H | A | 121-3 | 32.95 | 34.68 | 2.37 | 2.01 | 5.49 | 6.14 |
| OCH$_3$ | H | OCH$_3$ | H | B | 135-40 | 41.54 | 37.93 | 3.92 | 3.28 | 6.06 | 5.61 |

[1] This chlorine was introduced during the synthesis.
[2] This chlorine was present in the starting aniline.

USE OF THE COMPOUNDS AS HERBICIDES

Post-emergence herbicidal activity and selectivity of the compounds listed in Table I were evaluated according to the following procedure:

(1) Post emergence activity

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots were sprayed with an aqueous dispersion of the active compound prepared as described above, at a rate of 5 lb. of active compound per acre and at a spray volume of 60 gallons per acre. Approximately one week after the spray application the plants were observed and the results rated according to the following schedule:

C=chlorosis (bleaching)    0=no effect
N=necrosis    1=slight effect
G=growth inhibition    2=moderate effect
F=formative effect (abnormal form of growth)    3=severe effect
   4=maximum effect (all plants died)

Results are tabulated below in Table II.

Use of the novel compounds to combat undesired plant growth is further illustrated by the following examples.

EXAMPLE 1

6-chloro - 4,7 - dimethyl - 3H - 1,2,3 - benzodithiazole 2-oxide was employed as a post-emergence herbicide at 2 lb., 1 lb. and ½ lb. per acre according to the procedure outlined above against the following plants: green foxtail, wild mustard, pigweed, wild buckwheat, lamb's-quarters, corn cockle, morning glory, wheat, barley, oats and corn. At all three application rates complete control was obtained on wild mustard and pigweed with only slight effect on barley and oats. Below 2 lb. per acre the effect on wheat and corn was also only slight. At 2 lb. per acre complete control was also obtained on lamb's-quarters and morning glory.

In order to obtain uniform application of a small amount of active substance over a large area, the herbicide is preferably applied as a dispersion in a diluent such as water, obtained with the aid of a surface active agent. For shipping and storage prior to dilution and application the herbicides are formulated in the customary manner with a surface active agent and a relatively small amount of a solvent, oil or inert solid as a diluent. Both emulsifiable concentrates and wettable powders are useful and effective formulations.

EXAMPLE 2

4,6,7-trichloro - 3H - 1,2,3 - benzodithiazole 2-oxide was employed in combination with a surface active agent and a diluent as in Example 1. The test species of plants included lamb's-quarters, pigweed, kochia, green foxtail, sugar beets and wheat. Complete control was obtained on pigwood at application rates as low as ½ lb. per acre. At 1 lb. per acre injury to sugar beets and wheat was only slight. At ½ lb. per acre there was no discernible effect on either sugar beets or wheat.

The 3H-1,2,3-benzodithiazole-2-oxides are readily converted to corresponding aminomercaptans under alkaline conditions and may be used to manufacture thioindigoid vat dyestuffs and substituted phenothiazines. The novel compounds disclosed herein may be used to make substituted phenothiazines which have not been previously available.

What is claimed is:

1. 6 - chloro - 4 - trifluoromethyl-3H-1,2,3-benzodithiazole-2-oxide.

2. 5 - trifluoromethyl - 3H - 1,2,3 - benzodithiazole-2-oxide.

3. 4,6 - dimethoxy - 3H - 1,2,3 - benzodithiazole - 2-oxide.

TABLE II
Post emergence use of 3H-1,2,3-benzodithiazole-2-oxides

| Substituents | Millet | Soybean | Cotton | Alfalfa | Oats | Corn | Flax | Radish | Sugar beet | Wheat | Grain sorghum | Tomato |
|---|---|---|---|---|---|---|---|---|---|---|---|---|
| 4,6,7-trichloro- | 4 | 2 | 4 | 3 | 1 | 1 | 2 | 2 | 4 | 2 | 1 | 2 |
| 5,6,7-trichloro- | 2 | 1 | 3 | 3 | 0 | 1 | 2 | 2 | 4 | 1 | 1 | 4 |
| 6-chloro-4-methyl- | 3 | 2 | 4 | 4 | 1 | 1 | 2 | 3 | 4 | 2 | 1 | 2 |
| 6-chloro-4,5-dimethyl- | 1 | 1 | 3 | 2 | 1 | 1 | 1 | 1 | 3 | 1 | 1 | 3 |
| 6-chloro-4,7-dimethyl- | 4 | 4 | 3 | 2 | 2 | 1 | 3 | 3 | 4 | 2 | 3 | 3 |
| 6-chloro-4-trifluoromethyl- | 3 | | 4 | 4 | 1 | 1 | 4 | 4 | 4 | 1 | 1 | 4 |
| 5-trifluoromethyl- | 4 | 2 | 4 | 2 | 1 | 2 | 2 | 4 | 4 | 3 | 2 | 4 |
| 7-chloro-4,6-dimethoxy- | 2 | 1 | 2 | 1 | 1 | 1 | 2 | 1 | 4 | 1 | 1 | 4 |
| 6-methylmercapto- | 3 | 1 | 1 | 2 | 4 | 1 | 1 | 1 | 0 | 1 | 1 | 1 |
| 6-chloro-4-fluoro- | 2 | 3 | 4 | 3 | 1 | 1 | 2 | 2 | 4 | 1 | 1 | 4 |
| 5-chloro- | 2 | 2 | 3 | 2 | 1 | 1 | 1 | 1 | 3 | 1 | 0 | 2 |
| 4,5,6-trichloro- | 2 | 3 | 4 | 4 | 1 | 1 | 4 | 2 | 4 | 1 | 1 | 4 |
| 5,6-dichloro-4-methyl- | 3 | 4 | 3 | 4 | 1 | 1 | 2 | 2 | 4 | 1 | 2 | 3 |
| 4,6-dimethoxy- | 1 | 1 | 1 | 1 | 0 | 0 | 1 | 1 | 1 | 1 | 0 | 1 |

References Cited

UNITED STATES PATENTS 3,490,893    1/1970    Alle et al.    260—304

OTHER REFERENCES

Huestis et al.: J. Heterocyclic Chem., 5, 427–30 (1968).

RICHARD T. GALLAGHER, Primary Examiner

U.S. Cl. X.R.

71—91; 260—243 A, 306